Oct. 2, 1928.　　　　　　　　　　　　　　　　　1,685,943
J. V. DOBSON ET AL
SYSTEM OF CONTROL
Filed April 27, 1922　　　　4 Sheets-Sheet 1

WITNESSES:

INVENTORS
John V. Dobson &
Maurice F. Jones
BY
ATTORNEY

Oct. 2, 1928.

J. V. DOBSON ET AL 1,685,943

SYSTEM OF CONTROL

Filed April 27, 1922   4 Sheets-Sheet 2

WITNESSES:

INVENTORS
John V. Dobson &
Maurice F. Jones
BY
ATTORNEY

Oct. 2, 1928.
J. V. DOBSON ET AL
1,685,943
SYSTEM OF CONTROL
Filed April 27, 1922  4 Sheets-Sheet 3
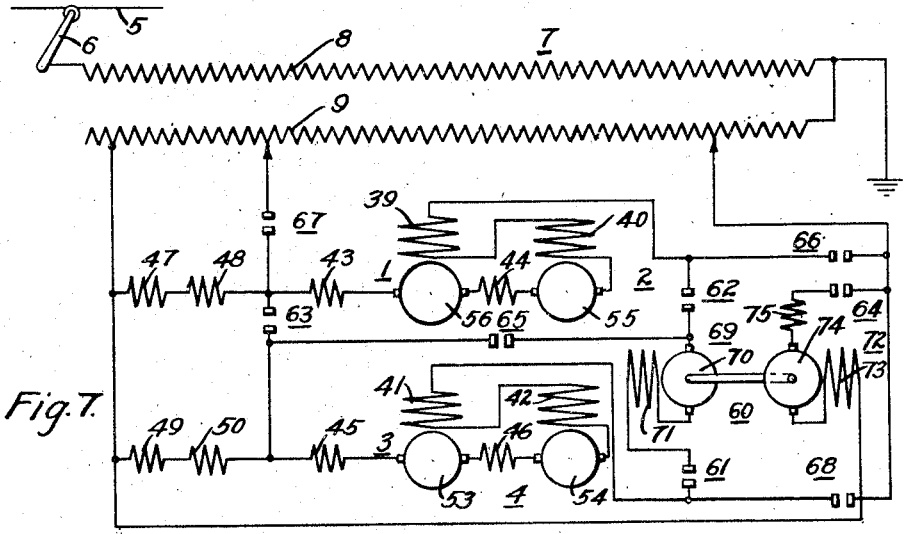
Fig. 7.
Fig. 8.
Sequence of Switches
| Step | 61 | 62 | 63 | 64 | 65 | 66 | 67 | 68 | Remarks |
|------|----|----|----|----|----|----|----|----|---------|
| a | o | o | o | | | | | | Preliminary |
| b | o | o | o | o | | | | | Starting D.C. |
| c | o | o | o | o | o | | | | Transition |
| d | o | | | o | o | | | | " |
| e | | | | o | o | o | o | | ½ ac – ½ DC. |
| f | | | | | | o | o | | Transition |
| g | | o | | | o | o | o | | A.C. Running |
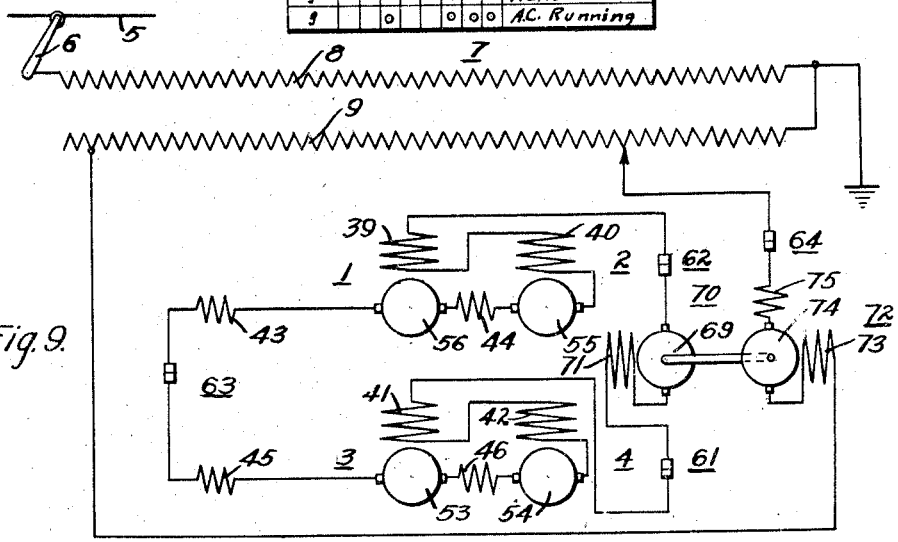
Fig. 9.
WITNESSES:
INVENTORS
John V. Dobson &
Maurice F. Jones
BY
ATTORNEY Patented Oct. 2, 1928.

1,685,943

UNITED STATES PATENT OFFICE.

JOHN V. DOBSON, OF FOREST HILLS, AND MAURICE F. JONES, OF WILKINSBURG, PENNSYLVANIA, ASSIGNORS TO WESTINGHOUSE ELECTRIC AND MANUFACTURING COMPANY, A CORPORATION OF PENNSYLVANIA.

SYSTEM OF CONTROL.

Application filed April 27, 1922. Serial No. 556,828.

Our invention relates to motor-control systems and it has particular relation to control systems that are employed for driving motor vehicles.

One object of our invention is to provide a motor-control system for a plurality of motors whereby they may be started by energizing them with direct current or alternating current of a frequency lower than the normal and subsequently energizing them with alternating current direct from the normal supply.

Another object of our invention is to provide means for preventing damage to the commutators, brushes and rotor windings of motors, which would be caused by their being energized by alternating current at times when the motors are unable to rotate.

Another object of our invention is to provide a system of control for governing a plurality of commutator-type motors that are energized at different periods by currents of materially different characteristics, and providing means for effecting the regeneration of current by the motors when they are mechanically driven, such, for example, as when a train is descending a heavy grade.

Heretofore, difficulty has been experienced in starting long freight trains, having locomotives equipped with commutator-type alternating-current motors at both the front and the rear of the train, because of the inability to start the locomotives simultaneously on heavy grades. Signals by the different engine whistles can not always be heard in mountainous districts, because of curvatures in the track caused by intervening hills or mountains. One of the locomotives may start to move some of the cars of the train and finally be brought to a dead stop prior to the beginning of operation of the other locomotive. In such a case, the driving motors of the active locomotive are brought to a standstill while energized, thereby causing a heating of the commutator, brushes, and windings and thus lessening the life of the motors. This heating effect is caused by the transformer action between the stator windings and the rotor coils that are short-circuited by the brushes.

Briefly speaking, our invention consists in avoiding this difficulty by energizing the motors of the locomotives by direct current or low-frequency alternating current until the locomotives and train attain a relatively low speed, such as a fractional part of one mile per hour. After the entire train has begun to move, the motors are consecutively transferred in groups from the direct-current source of energy to the alternating-current source of energy until all of the motors are operating upon alternating current.

For a better understanding of our invention, reference may be made to the accompanying drawings, Figure 1 of which is a simplified diagram of the main-motor circuits of a control system for an electric locomotive, constructed in accordance with our invention;

Fig. 2 is a sequence chart showing the preferred order of closure of the switches that are employed to govern the control system illustrated in Fig. 1;

Figs. 3 to 6, inclusive, are simplified diagrams illustrating the connections at various stages in the accelerating and the regenerative operation of the motors illustrated in Fig. 1;

Fig. 7 is a modified form of motor-control system constructed in accordance with our invention;

Fig. 8 is a sequence chart, illustrating the preferred order of closure of the switches that are employed to govern the control system illustrated in Fig. 7 of the drawings; and Figs. 9 to 13, inclusive, are diagrams illustrating the connections of the motors of the system illustrated in Figs. 7 at various stages in the operation of the motors.

Figures 1, 2:
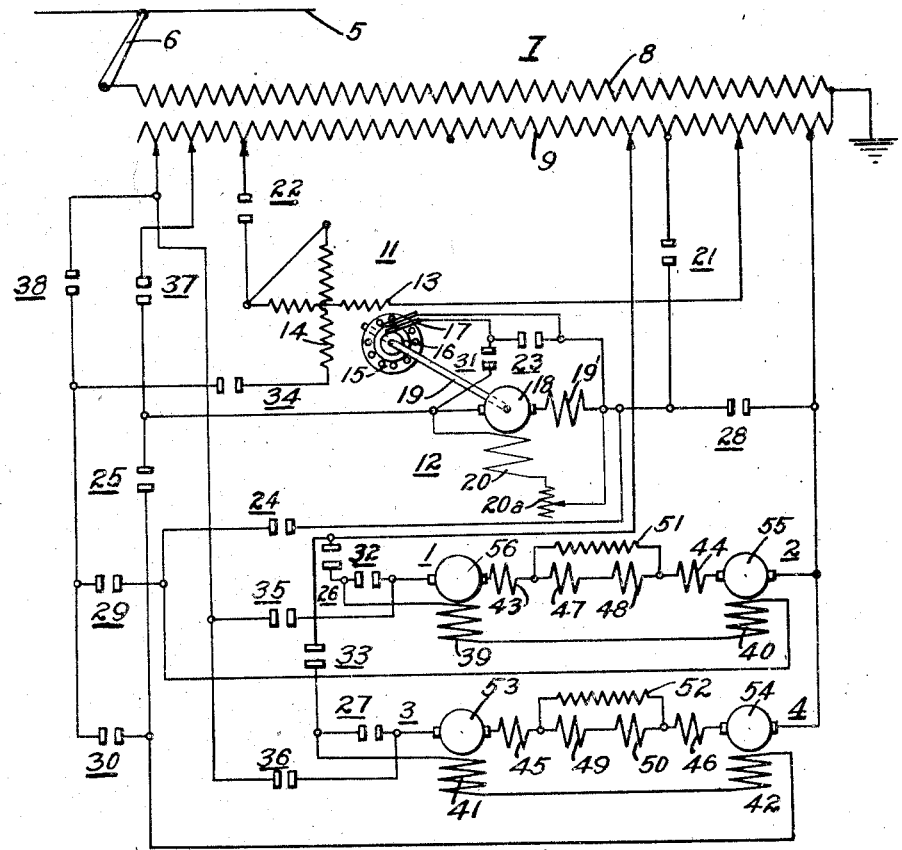

Referring particularly to Fig. 1 of the drawings, a plurality of main driving motors 1 to 4, inclusive, are energized from a source of alternating current 5 and a return circuit marked Ground by means of a current-collecting device 6 and a transformer 7, having a primary winding 8 and a secondary winding 9. A phase-converter 11 is mechanically coupled to a direct-current dynamo-electric machine 12 and is employed during the operation of the locomotive to govern the energization of the motors 1 to 4, inclusive, in a manner that will hereinafter be more fully set forth.

The phase converter 11 comprises a primary stator winding 13, a tertiary stator winding 14, a wound rotor 15, slip rings 16 and brushes 17. The dynamo-electric machine 12 is provided with an armature 18 that is mechanically connected, by means of a shaft 19, to the rotor 15 of the phase-converter 11, a series field winding 19' and a shunt field-magnet winding 20, the energization of which is governed by a field rheostat 20$^a$, in accordance with the usual practice.

A plurality of switches 21 to 38, inclusive, are employed to govern the control system for the motors 1 to 4, inclusive. The motors 1 to 4, inclusive, are provided with corresponding main or torque field-magnet windings 39 to 42, inclusive, compensating field-magnet windings 43 to 46, inclusive, and interpole or commutating windings 47 to 50, inclusive. A resistor 51 is connected in parallel relation to the interpole or commutating field-magnet windings 47 and 48 of the corresponding motors 1 and 2, and the interpole or commutating field-magnet windings 49 and 50 are likewise shunted by a resistor 52.

The motors 1 to 4, inclusive, of the locomotive are started by first setting in operation the phase-converter 11 and the dynamo-electric machine 12. This results is accomplished by closing the switches or contactors 21 and 37, in accordance with the step of the sequence chart of Fig. 2, marked "Connecting set," thereby establishing a circuit from secondary winding 9 through switch 21, series field-magnet winding 19' and armature 18 of the dynamo-electric machine 12 and switch 37 to another tap of the secondary winding 9 of the transformer 7.

The energization of the dynamo-electric machine 12 causes it to act as a starting motor to effect rotation of the wound rotor 15 of the phase-converter 11. The primary winding 13 of the phase-converter 11 is connected across a section of the secondary winding 9 of the main transformer 7 upon the closure of the switch 22. At the same time, the switch 23 is closed to short-circuit the winding upon the rotor 15 of the phase-converter 11, causing it to operate as a single-phase induction motor.

After the phase-converter 11 is started, the switches 21 and 37 are opened, and the switches 24 to 27, inclusive, are closed, thereby providing a circuit from the armature 18 of the machine 12 through switch 25, main field-magnet windings 42 and 41 of the corresponding driving motors 4 and 3, switch 27, armature 53, compensating field-magnet winding 45 and interpole or commutating winding 49 of the motor 3, interpole or commutator winding 50, compensating field-magnet winding 46, and armature 54 of the main driving motor 4, armature 55, compensating field-magnet winding 44 and interpole or commutating field-magnet winding 48 of the motor 2, interpole or commutating field-magnet winding 47, compensating field-magnet winding 43 and armature 56 of the main driving motor 1, switch 26, main or torque field-magnet windings 39 and 40 of the motors 1 and 2, switch 24 and series field-magnet winding 19' to the armature 18 of the machine 12, now acting as a generator.

Figure 3:
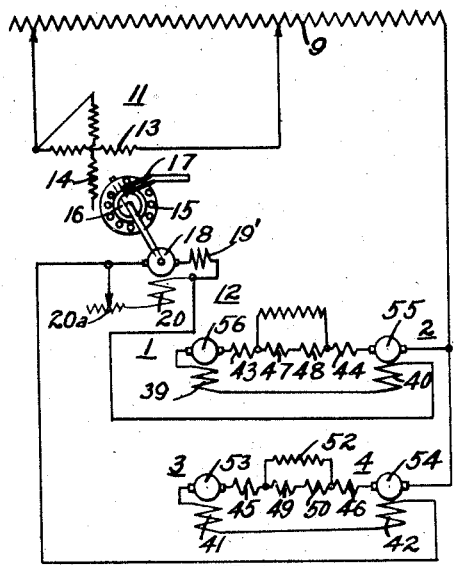

The motors 1 to 4, inclusive, at this time are either standing still or are rotating at a comparatively low speed. Consequently, only a small amount of electrical power will be consumed with respect to the power necessary at the higher speeds, and thus the generator 12 is capable of supplying sufficient energy to start the motors. The last circuit traced corresponds to the step of the sequence chart marked "Starting," and the circuit is illustrated by Fig. 3 of the drawings.

Figure 4:
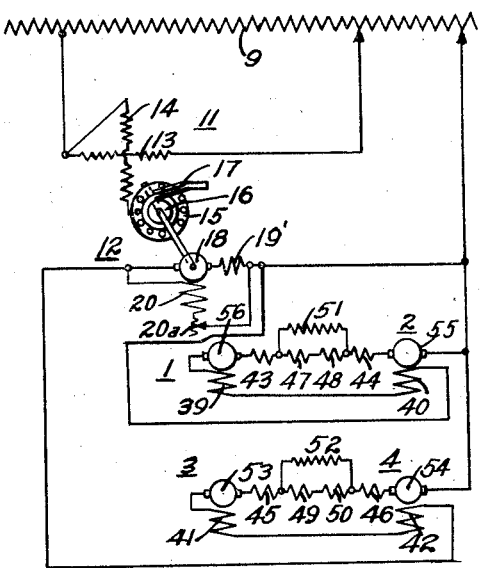

After the motors 1 to 4, inclusive, have started rotating, but have attained only a relatively low speed, the switch 28 is closed, in accordance with the first transition step of the sequence chart of Fig. 2, thereby shunting the motors 1 and 2, as is illustrated by Fig. 4 of the drawings. The motors 1 and 2 are then disconnected from the generator 12 by the opening of the switch 24. After the switch 24 has opened, the switch 29 is closed to connect the motors 1 and 2 directly to the secondary winding 9 of the main transformer 7 by a circuit that extends from the secondary winding 9 through the switches 38 and 29, main or torque field-magnet windings 40 and 39 of the corresponding motors 2 and 1, switch 26, armature 56 and field-magnet windings 43 and 47 of the motor 1, field-magnet windings 48 and 44 and armature 55 of the motor 2 to another tap of the secondary winding 9 of the main transformer 7. This arrangement of circuits corresponds to the position marked "½ AC—½ DC" of the sequence chart of Fig. 2.

After the motors 1 and 2 have been connected to the transformer 7 by the closure of the switch 29, the motors 3 and 4 are disconnected from the generator 12 by the opening of the switches 25 and 28. The motors 3 and 4 are then connected to the secondary winding 9 of the main transformer 7 by the closure of the switch 30, thereby establishing a circuit from the secondary winding 9 of the main transformer 7, through switches 38 and 30, main or torque field-magnet windings 42 and 41 of the corresponding motors 4 and 3, switch 27, armature 53, field-magnet windings 45 and 49 of the motor 3, field-magnet windings 50 and 46, and armature 54 of the motor 4 to another tap of the secondary winding 9 of the main driving motor 7.

Figure 5:
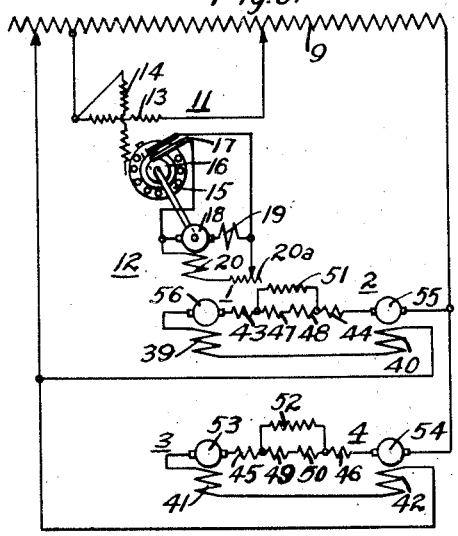

The motors 1 to 4, inclusive, are now connected in series-parallel relation across a portion of the secondary winding 9 of the main transformer 7, in accordance with the step marked "Full running" of the sequence chart of Fig. 2 and as is illustrated by Fig. 5 of the drawings. Power-factor correction of the motors 1 to 4, inclusive, may be effected by opening the switch 23 and closing the switch 31 to secure direct-current excitation of the rotor winding 15 of the phase-converter 11. The phase-converter 11 will now be functioning as a single-phase synchronous condenser and may be over-excited to correct for the lagging power-factor caused by the operation of the main driving motors 1 to 4, inclusive.

Regeneration may be effected by closing the switches 32 to 34, inclusive, after opening the switches 26, 27 and 38, in accordance with the first step marked "Regeneration" of the sequence chart of Fig. 2, thereby supplying current to the main or torque field-magnet windings 39 to 42, inclusive, of the corresponding motors 1 to 4, inclusive, by a plurality of circuits that are established from the secondary winding 9 of the main transformer 7, through switch 22, secondary winding 14 of the phase-converter 11, switches 34, 29 and 30, parallel-connected pairs of main field-magnet windings 42 and 41, and 40 and 39, and switches 32 and 33 to another tap of the secondary winding 9 of the main transformer 7.

After the energization of the main field-magnet windings 39 to 42, inclusive, of the corresponding motors 1 to 4, inclusive, the armatures thereof may be connected to the secondary winding 9 of the main transformer 7, by the closure of the swtches 35 and 36. When the switch 35 is closed, a circuit is established from the secondary winding 9, through switch 35, armature 56, field-magnet windings 43 and 47 of the motor 1, field-magnet windings 48 and 44 and armature 55 of the motor 2, to another tap of the secondary winding 9 of the main transformer 7. By the closure of the switch 36, a circuit is established from the secondary winding 9 of the main transformer 7, through switch 36, armature 53 and field-magnet windings 45 and 49 of the motor 3, field-magnet windings 50 and 46 and armature 54 of the motor 4 to another tap of the secondary winding 9 of the main transformer 7.

Figure 6:
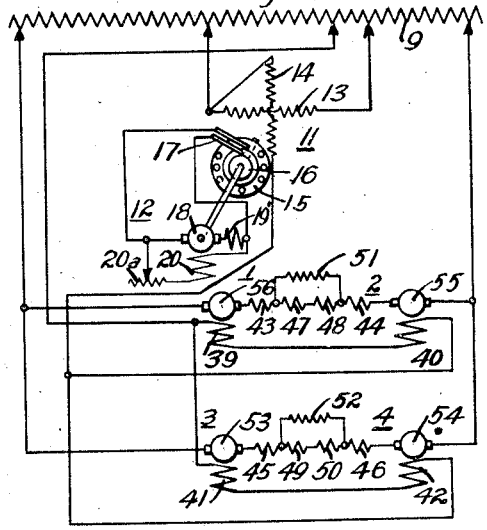

A diagram showing these connections is illustrated by Fig. 6 of the drawings. Power-factor regulation by variations in the excitation of the windings of the motors 1 to 4, inclusive, by means of the phase-converter 11, may be effected in a manner that is well understood by those skilled in the art. A description of the operation of such a system for power-factor regulation of alternating-current motors is described in the patent application of L. M. Perkins, Serial No. 273,082, filed January 25, 1919, and assigned to the Westinghouse Electric and Manufacturing Company.

Referring to the modified form of control system illustrated by Fig. 7 of the drawings, the corresponding parts are given like numerals. In this modified form of control system, a motor-generator set 60 has been employed in place of the phase-converter 11. This arrangement is preferable in installations where the railroad officials do not consider that regenerative braking is of sufficient advantage to them to warrant the extra first cost and cost of operation of the necessary additional equipment on the locomotive.

The motors 1 to 4, inclusive, and the motor-generator set 60 are governed by a plurality of switches 61 to 68, inclusive, in accordance with the sequence chart illustrated in Fig. 8 of the drawings.

The preliminary operations required for starting the motors 1 to 4, inclusive, by energizing them with direct-current energy, comprise closure of the switches 61 to 63, inclusive, in accordance with step $a$ of the sequence chart of Fig. 8, thereby connecting the generator 69 of the motor-generator set 60 in a closed loop comprising the motors 1 and 4, inclusive. This circuit extends from the armature 70 of the generator 69, through switch 62, main field-magnet windings 39 and 40 of the respective motors 1 and 2, armature 55 and compensating field-magnet winding 44 of the motor 2, armature 56 and compensating field-magnet winding 43 of the motor 1, switch 63, compensating field-magnet winding 45 and armature 53 of the motor 3, compensating field-magnet winding 46 and armature 54 of the motor 4, main field-magnet windings 42 and 41 of the respective motors 4 and 3, switch 61 and series field-magnet winding 71 of the generator 69 to the armature 70 thereof.

Upon the closure of the switch 64, the motor 72 of the motor-generator set 61 is energized by a circuit that is established from the secondary winding 9 of the main transformer 7 through the main or torque field-magnet winding 73, armature 74 and compensating field-magnet winding 75 of the motor 72 and switch 64 to secondary winding 9 of the main transformer 7.

Figure 10:
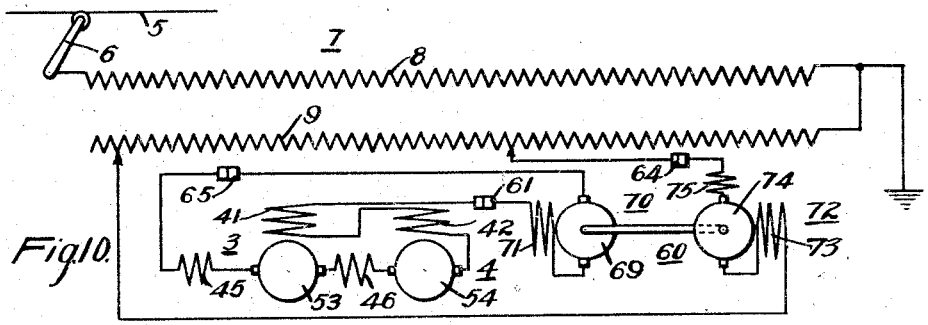

This arrangement of circuits is diagrammatically illustrated by Fig. 9 of the drawings. Transition of the motors 1 to 4, inclusive, from direct-current to alternating-current energization, is partially effected by the opening of the switches 62 and 63 after the closure of the switch 65, in accordance with steps $b$ and $c$ of the sequence chart of Fig. 8, thereby disconnecting the motors 1 and 2 from the generator 70 of the motor-generator set 60, as is illustrated by Fig. 10.

Figure 11:
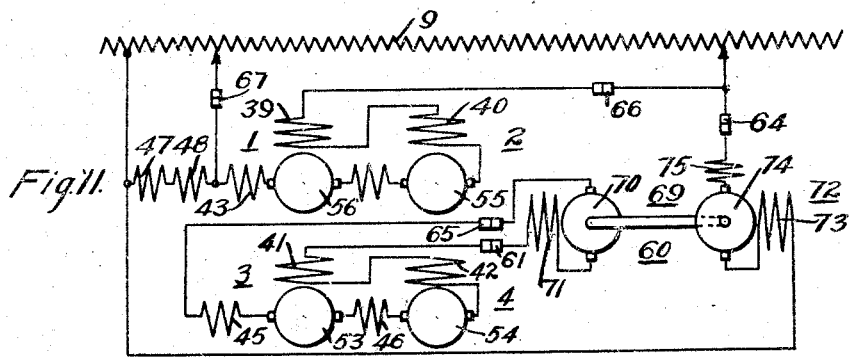

The motors 1 and 2 are then connected directly to the secondary winding 9 of the main transformer 7 by the closure of switches 66 and 67, as is indicated by step *d* of the sequence chart, and illustrated diagrammatically by Fig. 11 of the drawings.

Figure 12:
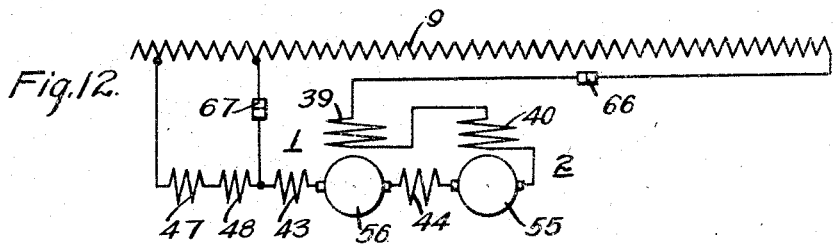

The motors 3 and 4 are then disconnected from the generator 69 of the motor-generator set 60 by opening the switches 61 and 65. The motor 72 of the motor-generator set 60 is de-energized by the opening of the switch 64. The arrangement of circuits at this stage is illustrated by Fig. 12 and is in accordance with step *f* of the sequence chart of Fig. 8.

Figure 13:
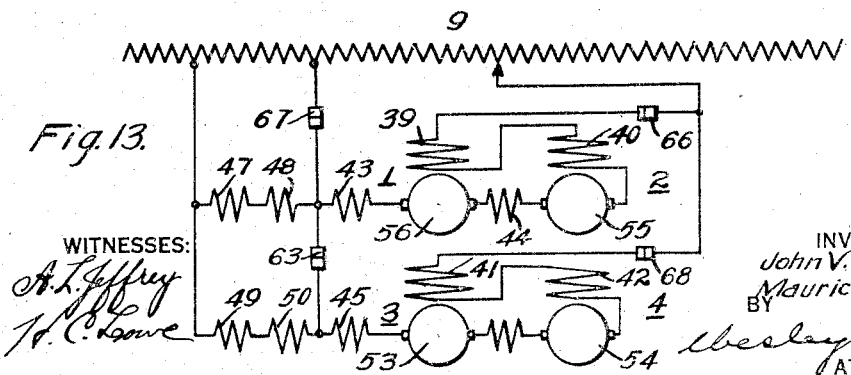

The motors 3 and 4 are then connected to the secondary winding 9 of the main transformer 7 by the closure of the switches 63 and 68 in accordance with the last step of the sequence chart of Fig. 8, thereby establishing the circuits illustrated by Fig. 13 of the drawings.

From the above description, it is apparent that we have provided a motor-control system for starting one or more motors by first energizing them with direct-current and subsequently energizing them with alternating current to effect further acceleration and propulsion of the train. It is also evident that the arrangement of circuits first described lends itself readily to regeneration of current when the motors are mechanically driven, and also to power-factor correction.

The substitution of low-frequency alternating current for direct current during the initial period of accelerating one or more motors to prevent damage to the commutators, brushes and rotor windings thereof is obvious to those skilled in the art and such substitution is intended to be covered by our broader claims.

Modifications may be made in the control system by supplying direct-current energy from some other source than that illustrated in the drawings, and the arrangement of switches may be different without departing from the spirit of our invention. We desire, therefore, to be limited only by the scope of the appended claims.

We claim as our invention:—

1. In a motor-control system, the combination with a plurality of motors, of a plurality of supply sources of different kinds of electrical energy, and means for consecutively connecting said motors to said sources without rendering all of the motors simultaneously inoperative.

2. In a motor-control system, the combination with a dynamo-electric machine adapted to act both as a motor and a generator, of a plurality of sources of different kinds of electrical energy, means for consecutively energizing said motor from said sources, and means comprising a power-factor correcting device for governing said motor during the regenerative period.

3. In a motor-control system, the combination with a motor adapted for both acceleration and regeneration, of a source of alternating current for energizing said motor, means comprising a phase-converter for governing said motor during regeneration, and means comprising a generator for energizing said motor with direct-current during the starting period.

4. In a motor-control system, the combination with a plurality of motors, of a source of alternating current, a source of direct current, means for connecting said motors to said direct-current source during a portion of the starting period, means for shunting at least one of said motors, means for connecting said shunted motor to said source of alternating-current, and means for subsequently disconnecting the remaining motors from said direct-current source and connecting them to said source of alternating-current.

5. In a motor-control system, the combination with a plurality of motors, of a source of alternating-current, a motor-generator set for supplying direct-current to said motors, a switch for connecting said motor-generator set to said source of alternating-current to effect the operation of said set, a plurality of switches for connecting said set to said motors to supply direct-current to said motors during a portion of the starting period, a switch for shunting at least one of said motors, a plurality of switches for connecting said shunted motor to said supply source of alternating-current, and a plurality of switches for connecting the remaining motors to said alternating-current source after they have been disconnected from said motor-generator set.

6. In a motor-control system, the combination with a plurality of motors, of a source of alternating-current, a motor-generator set for supplying direct-current to said motors, means for connecting said motors to said set, means for shunting a group of said motors, means for disconnecting said shunted motors from said set and connecting them to said source of alternating-current, and means for disconnecting the remaining motors from said set and connecting them to said source of alternating-current.

7. In a motor-control system, the combination with a plurality of motors, of a source of alternating-current energy, a generator capable of functioning as a motor, a phase-converter mechanically connected to said generator, means for connecting said phase-converter to said source of alternating-current, means for connecting said generator to said source of alternating-current to start said phase-converter, means for connecting said generator to said motors, means for shunting certain of said motors, means for connecting said shunted motors to said source of alternating-current, and means for disconnecting said remaining motors from said set and connecting them to said source of alternating-current.

8. In a motor-control system, the combination with a plurality of commutator-type motors adapted for both acceleration and regeneration, of a source of single-phase alternating-current energy, a two-unit auxiliary machine set, one unit of said set being adapted to be used, first as an alternating-current motor for starting said set, second as a direct-current generator for energizing said motors during a portion of their starting period and third as a direct-current exciter for the remaining unit of said set, the second unit of said set being adapted for use, first as a single-phase induction motor driving the first unit as a direct-current generator, second as a single-phase synchronous condenser for power-factor correction, and third, as a phase-converter for exciting the torque field-magnet windings of said railway motors during their regenerative period of operation, and means for affecting transition of said motors from said generator to the source of alternating-current with the loss of propelling torque on only a portion of said motors.

9. In a control system for motors adapted for operation on different kinds of electric current, in combination, a propelling motor, a source of supply of alternating current for the motor, a dynamo disposed to be connected across the source of supply to be operated as a motor, an alternating current motor coupled to the dynamo, means for connecting the dynamo to the source of supply to start the alternating current motor, means for connecting the alternating current motor when rotating to the source of supply to operate the dynamo as a direct current generator, means for connecting the propelling motor to the dynamo operating as a generator to start said motor on direct current, and means for connecting the propelling motor when operating to the source of supply of alternating current.

10. In a control system for motors adapted for operation on different kinds of electric current, in combination, a propelling motor, a source of supply of alternating current for the motor, a dynamo disposed to be connected across the source of supply to be operated as a motor, an alternating current motor provided with stator and rotor windings coupled to the dynamo, means for connecting the dynamo to the source of supply to start the alternating current motor, means for connecting the alternating current motor when rotating to the source of supply to operate the dynamo as a direct current generator, means for connecting the propelling motor to the dynamo operating as a generator to start said motor on direct current, and means for connecting the dynamo operating as a generator to the rotor winding for providing direct current excitation for the alternating current motor.

In testimony whereof, we have hereunto subscribed our names this 18th day of April, 1922.

JOHN V. DOBSON.
MAURICE F. JONES.